US012320193B2

(12) United States Patent
Ouyang et al.

(10) Patent No.: US 12,320,193 B2
(45) Date of Patent: Jun. 3, 2025

(54) ROLL-UP DOOR WITH SPIRAL BRACKETS

(71) Applicant: Overhead Door Corporation, Lewisville, TX (US)

(72) Inventors: Ruiping Ouyang, Richardson, TX (US); Thomas Joseph Steckbeck, Mifflintown, PA (US); Kazuo Mita, Lewisville, TX (US); Toru Kimura, Lewisville, TX (US)

(73) Assignee: Overhead Door Corporation, Lewisville, TX (US)

( * ) Notice: Subject to any disclaimer, the term of this patent is extended or adjusted under 35 U.S.C. 154(b) by 785 days.

(21) Appl. No.: 17/380,942

(22) Filed: Jul. 20, 2021

(65) Prior Publication Data

US 2021/0348442 A1 Nov. 11, 2021

Related U.S. Application Data

(62) Division of application No. 16/122,730, filed on Sep. 5, 2018, now Pat. No. 11,162,301.

(Continued)

(51) Int. Cl.

| | |
|---|---|
| ***E06B 9/62*** | (2006.01) |
| ***E06B 9/06*** | (2006.01) |
| ***E06B 9/15*** | (2006.01) |
| ***E06B 9/17*** | (2006.01) |
| ***E06B 9/58*** | (2006.01) |

(52) U.S. Cl.

CPC ........ *E06B 9/17007* (2013.01); *E06B 9/0638* (2013.01); *E06B 9/15* (2013.01); *E06B 9/17061* (2013.01); *E06B 9/581* (2013.01); *E06B 9/62* (2013.01); *E06B 2009/0684* (2013.01); *E06B 2009/1583* (2013.01)

(58) Field of Classification Search

None

See application file for complete search history.

(56) References Cited

U.S. PATENT DOCUMENTS 4,205,713 A * 6/1980 Galbreath ............. E05D 15/242 160/201
5,447,187 A * 9/1995 Gustafson .................. B60J 5/14 160/40

(Continued)

FOREIGN PATENT DOCUMENTS

DE 102005049584 A1 * 5/2007 ............... E06B 9/08

*Primary Examiner* — Phi D A

(74) *Attorney, Agent, or Firm* — Haynes and Boone, LLP

(57) ABSTRACT

This disclosure presents a safe high speed roll-up door with spiral brackets. To enable a high speed operation, robust spiral brackets having efficient spacing are provided to guide the plurality of sectional slats. Durable and low noise signature rollers are used. A unique assembly configuration of the slats and the tracks guiding the rollers enable quick replacement of each individual roller without disassembling the door. A double-belt counter weight mechanism balances the door and incorporates safety sensors that prevent loosening the belts when the door is jammed. The belts are further adjustable using ratchets such that adjustment for the horizontal balance as well as weight position is made effortless. In all, the high speed roll-up door using sectional slats performs faster and quieter, withstands greater loads, and lasts longer than other existing roll-up doors with spiral brackets.

20 Claims, 14 Drawing Sheets

Related U.S. Application Data

(60) Provisional application No. 62/555,484, filed on Sep. 7, 2017.

(56) References Cited

U.S. PATENT DOCUMENTS

| | | | | |
|---|---|---|---|---|
| 5,488,982 | A * | 2/1996 | Rejc | E06B 9/15<br>160/310 |
| 5,727,614 | A * | 3/1998 | Lichy | E06B 9/581<br>160/205 |
| 6,123,139 | A * | 9/2000 | Kalempa | E06B 3/485<br>160/133 |
| 6,185,783 | B1 * | 2/2001 | Carpinella | E05D 15/165<br>16/107 |
| 2002/0179254 | A1 * | 12/2002 | Schulte | E06B 9/90<br>160/201 |
| 2007/0277941 | A1 | 12/2007 | Jansen et al. | |
| 2007/0277943 | A1 | 12/2007 | Boerger et al. | |
| 2008/0251220 | A1 | 10/2008 | Rejc et al. | |
| 2009/0199978 | A1 * | 8/2009 | Crider | E06B 7/16<br>160/133 |
| 2010/0218431 | A1 | 9/2010 | Hardison, III et al. | |
| 2017/0356240 | A1 | 12/2017 | Balbach et al. | |
| 2018/0258689 | A1 * | 9/2018 | Rejc | E06B 9/68 |
| 2019/0071923 | A1 * | 3/2019 | Ouyang | E06B 9/0638 |
| 2019/0106919 | A1 * | 4/2019 | Kelley | E05D 15/242 |
| 2019/0263228 | A1 | 8/2019 | Zeng | |
| 2020/0131845 | A1 | 4/2020 | Fischer | |

* cited by examiner

ROLL-UP DOOR WITH SPIRAL BRACKETS

CROSS REFERENCE TO RELATED APPLICATIONS

This application is a divisional of U.S. patent application Ser. No. 16/122,730 filed Sep. 5, 2018; which claims the benefit of and priority to U.S. Provisional Patent Application No. 62/555,484, filed Sep. 7, 2017, both of which are incorporated herein by reference in their entirety.

TECHNICAL FIELD

This document relates to a roll-up door, in some particular embodiments, to a high speed roll-up door, such as a multi-sectional high speed roll-up door with spiral brackets.

BACKGROUND

High speed roll-up doors are oftentimes formed having multiple sections of slats instead of a continuous piece of fabric to form the face of the door. Unlike fabric materials that may be rolled at a continuously changing curvature, sectional slats must be spaced apart when they are rolled up as the door approaches the open configuration. The spacing of the rolled-up sectional slats may be provided using a spiral track, for example, provided by a pair of spiral brackets holding the sectional slats. However, the strength of the spiral brackets and spacing parameters often limit the height of the roll-up door. For example, the spiral bracket may be formed with a ductile material with a large spacing for ease of manufacture. But such choice would negatively affect the operation speed, because ductile materials may deform under a high speed operation, not to mention that the large spacing requirement will limit the overall door height. There is a need for improving the speed and reliability of such high speed roll-up doors.

SUMMARY

This disclosure presents a safe high speed roll-up door with spiral brackets. To enable a high speed operation, robust spiral brackets having efficient spacing are provided to guide a number of sectional slats of the high speed roll-up door. Durable and low noise signature rollers are used to support each sectional slat. A unique assembly configuration of the slats and the tracks guiding the rollers enable a quick replacement of each individual roller without disassembling the door completely. A double-belt counter weight mechanism balances the door and incorporates safety sensors that prevent loosening the belts when the door is accidentally jammed. The belts are further adjustable using ratchets such that adjustment for the door's horizontal balance as well as weight position is made effortless. Thus, in some implementations, the high speed roll-up door using the spiral brackets can perform faster and quieter, withstands greater loads, and lasts longer than existing roll-up doors.

In a first general aspect, a spiral bracket for a high speed roll-up door, the spiral bracket comprising: a first plate having a first spiral pattern cut out from the base plate, the first spiral pattern having a first width; a second plate having a second spiral pattern having a varying curvature of that of the first spiral pattern, the second spiral pattern having a second width greater than the first width; a bent strip inserted into the first spiral pattern of the first plate and extending the first spiral pattern, the bent strip welded with the second plate.

The bent strip is welded to the first plate.

The second plate comprises a plurality of through holes for receiving welding deposits for welding with the bent strip.

The first plate, the bent strip and the second plate form a spiral track for a roller such that the roller rolls onto the bent strip and is confined between the first and the second plates.

The first plate, the second plate and the bent strip are formed from a uniform-thickness metal plate having a thickness of about 2-10 mm. In other situations, however, the first plate, the second plate, and the bent strip are of different metal plates having different thicknesses. For example, in some implementations, the first plate has a thickness of about 6.35 mm (0.25 inches) and is formed from laser sheet steel. The second plate may have a thickness of about 2.38 mm (3/32 inches) and is formed from laser sheet steel. The bent strip may have a thickness about 3.05 mm (0.12 inches) and is formed from coil steel.

The varying curvature of the first and the second spiral pattern is defined by an initial radius r and a constant rate of change c with respect to a radial position a that is an angle with respect to the initial position, such that an instant radius at the radial position $\alpha R(\alpha)=r+c*(\alpha/2\pi)$, wherein $0\leq\alpha$.

The rate of change c is a function of a width of a slat forming the high speed roll-up door.

The greater the width of the slat is, the greater the rate of change c is.

The first width equals to the rate of change c in value.

A method for manufacturing a spiral bracket comprising: cutting, through a first plate, a first spiral pattern, the first spiral pattern having a first pattern width and a slot width; providing a piece of metal strip, wherein the metal strip has a first width and a first thickness, the first thickness being less than but approximately equal to the slot width of the first spiral pattern; bending and inserting the metal strip into the first spiral pattern of the first plate; cutting a second plate having a second spiral pattern, the second spiral pattern having a same curvature profile as the first spiral pattern and a second pattern width greater than the first pattern width and a cover width greater than the slot width; and welding the second plate to cover the bent metal strip to form a spiral track for receiving rollers of a roll-up door panel.

The method further includes producing a plurality of through holes in the second plate for welding the second plate to cover the bent metal strip.

In some embodiments, each of the plurality of through holes has a diameter less than or equal to the first thickness of the metal strip. In other instances, however, the diameter of the through holes can be greater than the first thickness of the metal strip. For example, the diameter of the through holes can be about 6.35 mm or 0.25 inches while the thickness of the metal strip is about 3 mm or 0.12 inches thick.

Welding the second plate to the bent metal strip comprises depositing a melted weld material through the plurality of through holes.

The varying curvature of the first and the second spiral pattern is defined by an initial radius r and a constant rate of change c with respect to a radial position a that is an angle with respect to the initial position, such that an instant radius at the radial position $\alpha R(\alpha)=r+c*(\alpha/2\pi)$, wherein $0\leq\alpha$.

The rate of change c is a function of a width of a slat forming the high speed roll-up door.

The greater the width of the slat is, the greater the rate of change c is.

The first width equals to the rate of change c in value.

A high-speed roll-up door assembly comprising: a plurality of sectional panels slidingly moving between an open position and a close position, each of the plurality of sectional panels having a roller at each end; a track enclosing the roller, the track having a removable cover; wherein the roller includes a shaft that is secured to each of the plurality of sectional panels via a fastener, such that when the plurality of sectional panels moves toward the open position, the fastener is exposed for removal.

The track comprises a straight section and a spiral section.

The plurality of sectional panels are retracted in the spiral section in the open position.

The shaft of the roller is inserted into each of the plurality of the sectional panels in a longitudinal direction and the fastener moves in and out of each of the plurality of the sectional panels in a traverse direction perpendicular to the longitudinal direction.

In some embodiments, the shaft of the roller is secured by a fastener holding the shaft to each of the plurality of the sectional panels. In some other embodiments, the shaft of the roller can be secured by two fasteners holding the shaft to each of the plurality of the sectional panels.

The roller further comprises a bearing and a tire rotatably coupled to the shaft via the bearing.

The tire of the roller is sufficiently elastic to absorb noise during high speed movement of the plurality of the sectional panels.

In some embodiments, the tire of the roller is made of urethane. In other instances, the tire of the roller can be made of neoprene.

The roller further comprises a stopper between the tire and each of the plurality of sectional panels such that side movements of the plurality of sectional panels are limited by the stopper that alleviates friction between the bearing and the track.

A belt drive system for a high-speed roll-up door, the belt system comprising: a common shaft connecting a first power reel and a second power reel, the first power reel holding a first belt and the second power reel holding a second belt; a support shafting providing an axis of rotation for a first guide reel and a second guide reel, wherein the first guide reel is tangentially aligned with a bottom end of the high-speed roll-up door and the second guide reel is tangentially aligned with a track through which a counterbalancing weight travels; a first ratchet mechanism connecting the first belt to the bottom end of the high-speed roll-up door; and a second ratchet mechanism connecting the second belt to the counterbalancing weight.

The first ratchet mechanism adjusts the length of the first belt for adjusting position of the bottom end of the high-speed roll-up door.

The second ratchet mechanism adjusts the length of the second belt such that the counterbalancing weight hangs above the ground when the high-speed roll-up door is at a fully open position.

A belt drive system for a high-speed roll-up door, the belt system comprising: a common shaft connecting a first power reel and a second power reel, the first power reel holding a first belt and the second power reel holding a second belt; a support shafting providing an axis of rotation for a first guide reel and a second guide reel, wherein the first guide reel is tangentially aligned with a bottom end of the high-speed roll-up door and the second guide reel is tangentially aligned with a track through which a counterbalancing weight travels; and a tension sensitive tensioner positioned between the first guide reel and the first power reel for determining tensioning level of the first belt.

The belt drive system further includes a drive motor operable to rotate the common shaft.

The tension sensitive tensioner is electrically connected to the drive motor, the tension sensitive tensioner, in response to sensing a lack of tension, prevents the drive motor from actuating to lifting the counterbalance weight.

BRIEF DESCRIPTION OF THE DRAWINGS

Like numerals refer to like elements throughout the illustrations.

DETAILED DESCRIPTION

Figure 1:
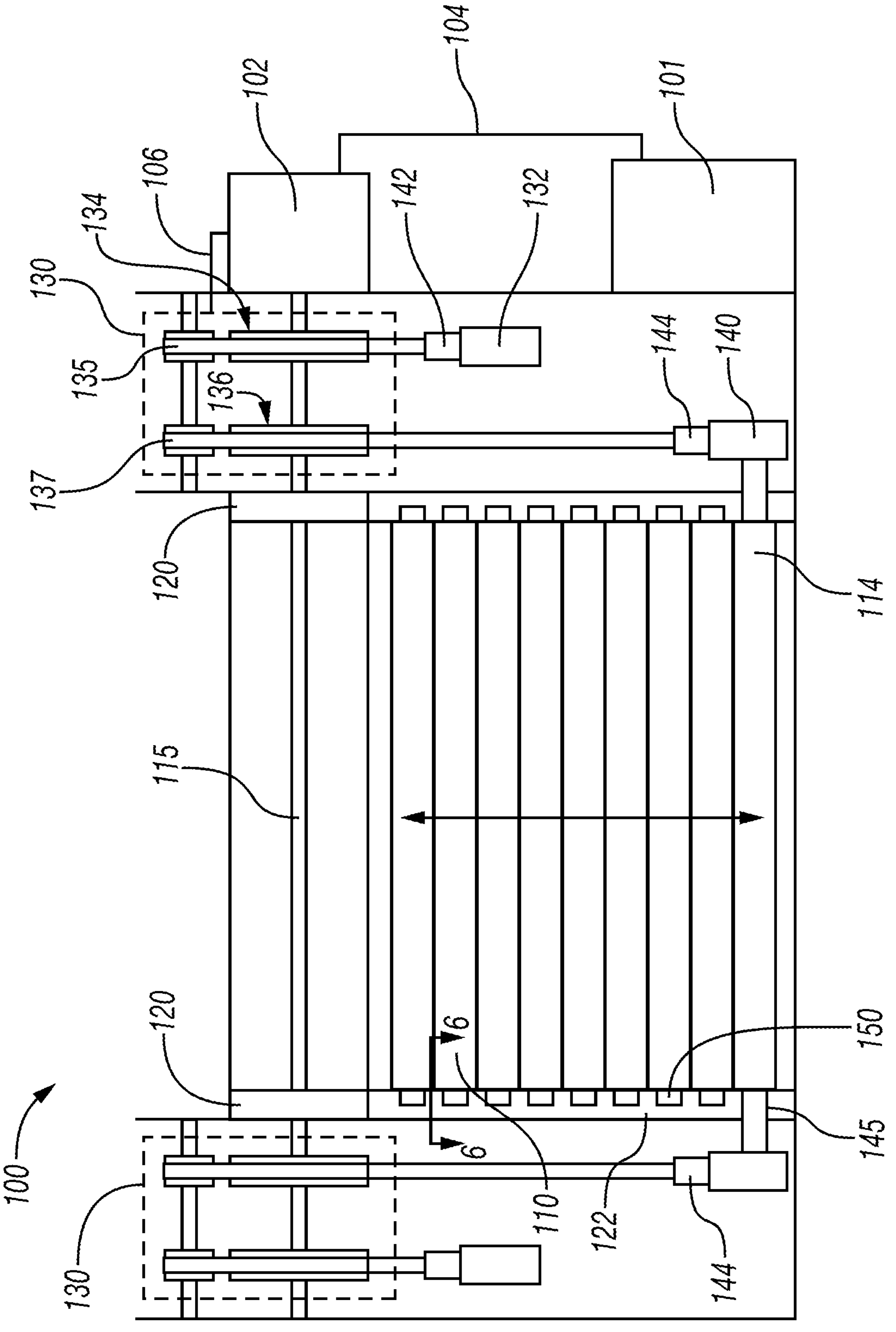
FIG. 1 is a schematic elevational view of a high-speed roll-up door in which a pair of spiral brackets is employed to advantage.

FIG. 1 is a schematic front elevational view of a high-speed roll-up door 100. In the embodiment illustrated in FIG. 1, the roll-up door 100 includes a pair of spiral brackets 120 and vertical tracks 122 to guide a plurality of slats 110 forming a door 113 movable between a closed position, to prevent access through a passageway 116, and an open position, to facilitate access through the passageway 116. Each of the slats 110 includes a roller 112 at each respective end and disposed movable within the vertical tracks 122 and the spiral brackets 120. As illustrated in FIG. 1, the vertical tracks 122 are positioned along the vertical columns of the passageway 116 and the spiral brackets 120 are aligned in a position generally above the passageway 116. When the door 113 is in the open position, the slats 110 are rolled into and are otherwise supported by the spiral brackets 120. As explained in greater detail below, each spiral bracket 120 includes a roll-up spiraled track 124, which guides and otherwise stores the slats 110 in a stored position as the as the door 113 is moved toward the closed position. The track 124 is formed having a curvature so that as the slats 110 move therein, the respective slats 110 remain spaced apart to avoid contact and damage thereto.

With continued reference to FIG. 1, as the door 113 is moved from the closed position to the open position, a bottom slat 114 is driven upward and balanced by a dual belt counterbalancing and drive system 130. In the embodiment illustrated in FIG. 1, the dual belt counterbalancing system 130 includes a counterbalance belt 135 and a drive belt 137 and is positioned on each side of the passageway 116; however, it should be understood that the counterbalancing and drive system 130 may be otherwise configured. For example, the counterbalancing and drive system 130 may be positioned only on a single side of the passageway 116. As illustrated, the counterbalancing and drive system 130 engages the bottom slat 114 via a connection piece/coupling member 145 such that, as explained in greater detail below, a drive belt 137 pulls and otherwise lifts the bottom slat 114 upward toward the spiral brackets 120. The counterbalance belt 135 counterbalances the door 113 during movement thereof.

Referring specifically to FIG. 1, the system 130 includes a common drive shaft 115, a first reel or drive pulley 136 in which the drive belt 137 is wound thereon to lift or otherwise raise the bottom slat 114, and a second reel 134 in which the counterbalance belt 135 is wound thereon to apply a counter balancing torque to the common shaft 115. The counterbalance belt 135 connects a counterbalance weight 132 to the second reel 134. The second reel 134 is rotatably connected with the first reel 136 via the common shaft 115.

As illustrated in FIG. 1, a ratchet mechanism 142 connects the counterbalance belt 135 with the weight 132. In use, the ratchet mechanism 142 enables the counterbalance belt 135, and the length thereof, to be adjusted. Similarly, a ratchet mechanism 144 connects the driver belt 137 with the connecting piece 145 for adjusting the length of the driver belt 137.

In operation, the door 113 is driven between the open and closed position via a drive system 102. According to some embodiments, the drive system 102 includes a motor 106 for rotating the drive shaft 115, which as explained in greater detail below, operates to position the door 113 between the open and closed positions. It should be understood, however, that drive system 102, in addition to, or in lieu of a motor, can include a manually driven chain drive system or other applicable systems for positioning the door 113 between the open and closed positions. According to some embodiments, the drive system 102 is connected to a controller 101 via a control line 104. The controller 101 serves as an interface for a user to command and monitor the operation of the roll-up door 100. For example, the control terminal 101 may include a monitor display, a touch screen, a keyboard, a touch pad, a mouse, or other input and output devices for a user to control, adjust, or program the operation of the roll-up door assembly 100.

Figure 2A:
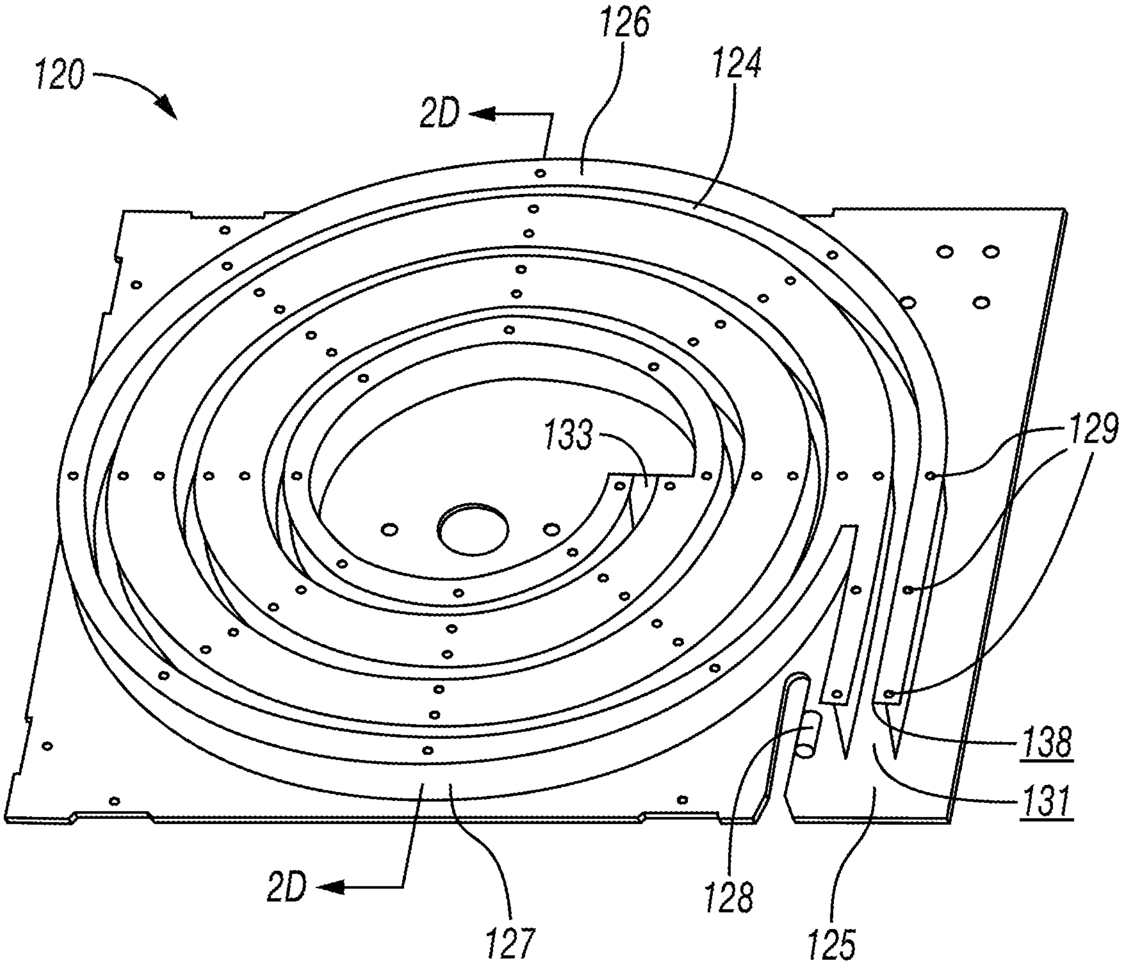
FIG. 2A is a perspective view of an embodiment of a spiral bracket of the high-speed roll-up door of FIG. 1.

FIG. 2A is a perspective view of a spiral bracket 120 of FIG. 1 formed having a back plate 125, a cover plate 126 spaced apart from the back plate 125 by a spiraling strip member 127 and forming a spiral track 124. It should be understood that the spiral brackets 120 on both sides of the passageway 116 have the same configuration; thus, for purposes of simplicity, only one spiral bracket 120 will be discussed. In the embodiment illustrated in FIG. 2A, the spiral track 124 is formed by the spiraling strip member 127, which extends between the back plate 125 and the cover plate 126. The spiral track 124 includes an entranceway 131 and spirals around and ultimately terminates at a terminal end 133 and is sized to receive the rollers 112 therein. In operation, the spiral track 124 guides the rollers 112 as they enter the entranceway 131 during operation. According to some embodiments, the back plate 125, the metal strip 127, and the cover plate 126 provide a rectangular cross sectional channel for the rollers 112, with an opening 138 formed in the cover plate 126 to receive the shafts for rollers 112. In some embodiments, the cover plate 126 is welded onto the metal strip 127 via a number of through weld holes 129, as best seen in FIG. 2A.

In some embodiments, the back plate 125, the cover plate 126, and the metal strip 127 are made from a stock metal plate of a uniform thickness, between about 2 mm to 15 mm (or about 3/32"-½"). The stock metal plate may be made of an alloy material having strength properties suitable for the selected size, cost, strength, and other considerations. For example, when the alloy material is of a high strength material, such as stainless steel, the uniform thickness of the stock metal plate may be thinner than when the alloy material is of a low strength material, such as aluminum. Cost of assembly labor, manufacture considerations, project time, and other factors may further guide a proper election of the stock metal plate properties.

Figure 2B:
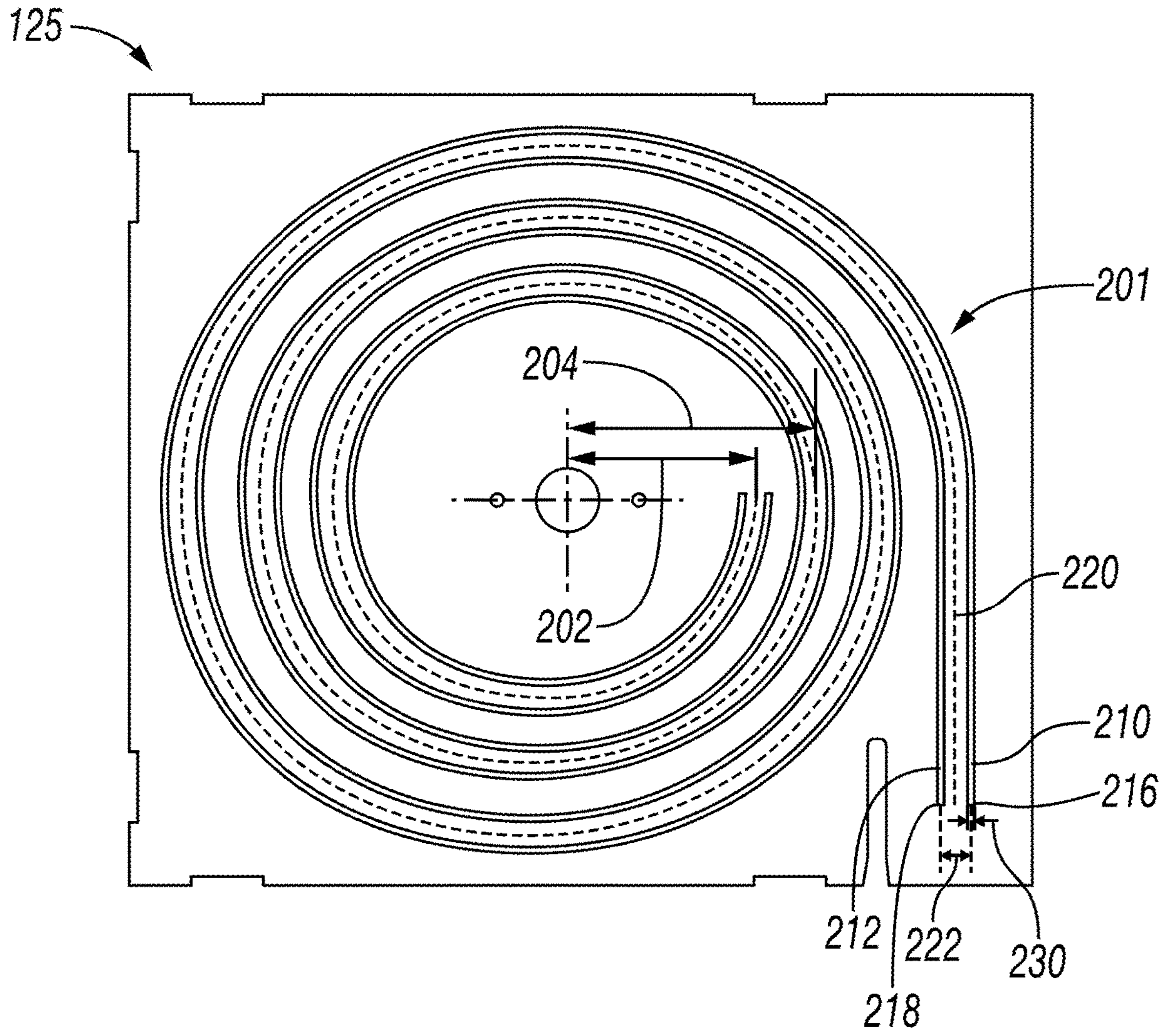
FIG. 2B is an elevational view of a back plate of the spiral bracket of FIG. 2A.

Referring to FIG. 2B, the back plate 125 is illustrated with the cover plate 126 and strip member 127 removed therefrom. In the embodiment illustrated in FIG. 2B, the back plate 125 includes a first spiral pattern 201 formed therein. The first spiral pattern 201 is formed having a width 222 defined by a pair of slots 210 and 212, each slot 210, 212 having a respective slot width 230. It should be understood that the slots 210 and 212 may be formed using various methods, including laser cutting, etching, milling, and other techniques. Each of the slots 210 and 212, and thus, the width 222, maintains an equal distance along a varying path or curvature 220 of the first spiral pattern 201. The slots 210 and 212 extend generally from the central portion of the back plate 125 winding along the path 220 terminating at alignment ends 216 and 218, which are positioned and sized to align with the vertical track 122.

In some embodiments, the path 220 is defined by an initial radius 202 and a constant rate of change increasing as the path 220 spirals outward. For example, in FIG. 2B, the constant rate of change is the difference between the next radius 204 and the initial radius 202. The varying curvature/path 220 may be defined using the following geometric representation: a radial position a is an angle with respect to the initial position of the varying curvature 220 at the center. The instant radius at the radial position a can be represented by: $R(\alpha)=r+c^*(\alpha/2\pi)$, wherein $0\geq\alpha$, r is the initial radius 202, and c is the constant rate of change.

The values for the initial radius r and the constant rate of change c may be determined based on the width of the slats 110. For example, the smaller the width is for each of the slats 110, the smaller values are for both r and c. Similarly, the greater the width of the slats 110, the greater the rate of change c needs to be to enable the slats 110 to be fully carried onto the spiral brackets 120. That is, both the initial radius 202 and the rate of change c may be functions of the width of the slats 110. In some embodiments, the first width 222 equals to the rate of change c subtracted by an integer number of the slot width 230. Other parameter selections to determine the initial radius, the first width, the slot width, and the constant rate of change care possible.

In some instances, the spiral bracket 120 further includes an alignment structure 128 for aligning with the vertical track 122. According to some embodiments, the alignment structure 128 includes, for example, a cylinder, a cube, or other solid structures, welded directly onto the back plate 125 and provides a through hole for a corresponding alignment pin. The vertical track 122 includes a matching coupling structure that includes a second through hole for the alignment pin to go through. During installation, the alignment holes on the respective spiral bracket 120 and the vertical track 122 are generally aligned and an alignment pin is inserted therethrough. Details of the alignment structure 128 are further illustrated in FIG. 3 and discussed below in further detail below.

In other embodiments, the varying path 220 may employ a variable rate of change such that the slats 110 may speed up or slow down upon entering the spiral bracket 120. For example, a smaller radius often requires the slats 110 to have a slower velocity as they enter the spiraled track 124 while a larger radius enables a higher speed as the slats 110 enter the spiraled track 124. A specific varying curvature 220 may be determined depending on different operational speeds and motor capacity in response to different loading conditions during movement of the door 113 between the open and closed positions.

Figure 2C:
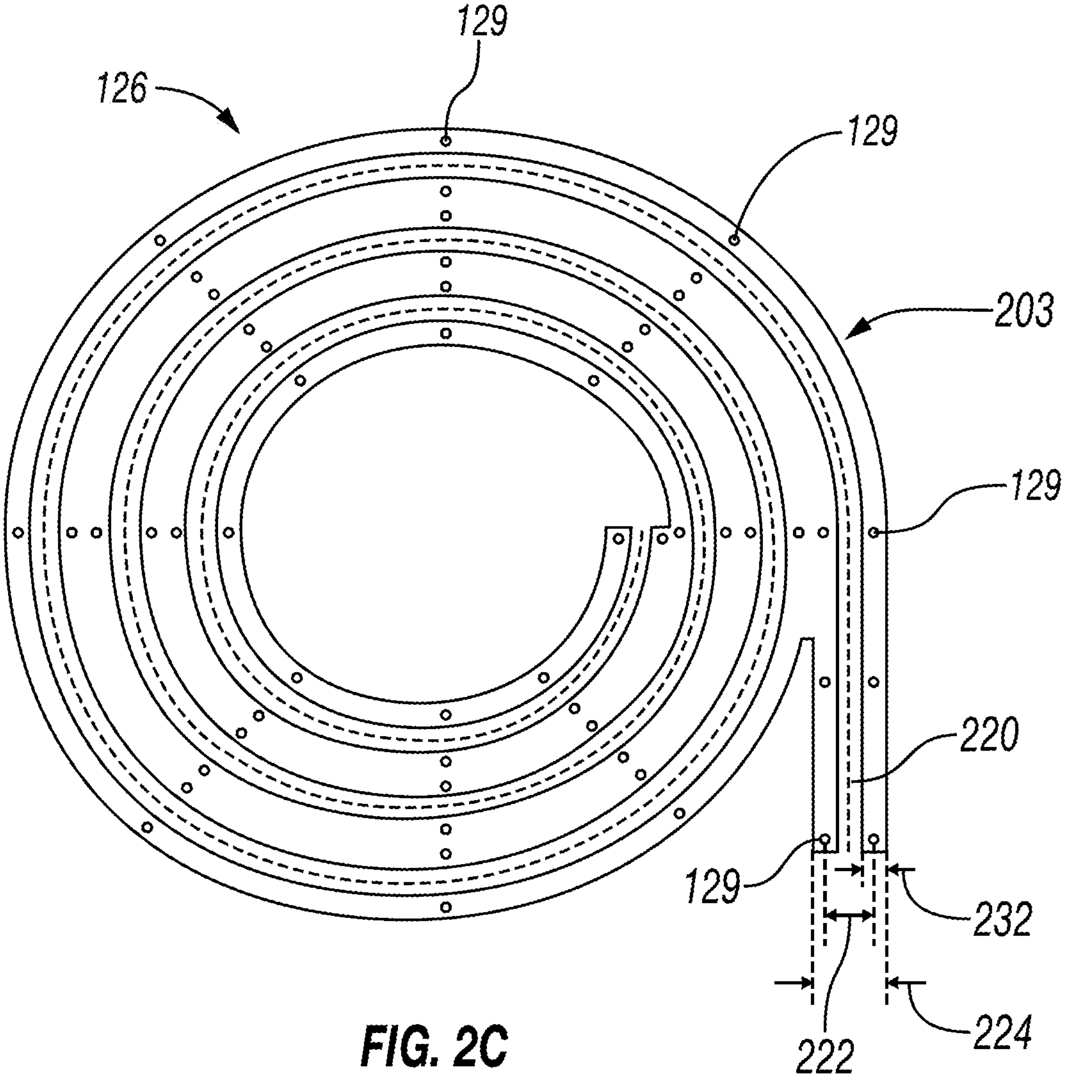
FIG. 2C is an elevational view of a cover plate of the spiral bracket of FIG. 2A.
Figure 2D:
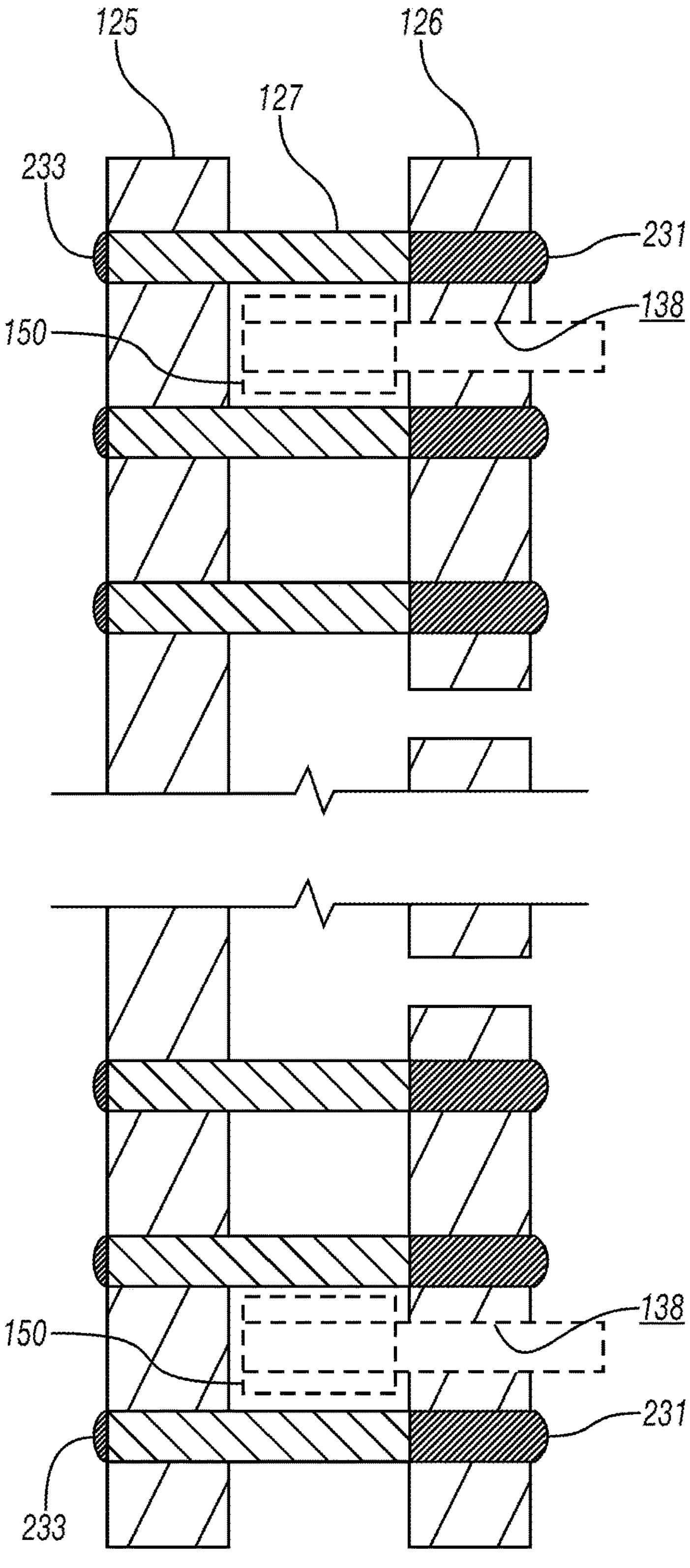
FIG. 2D is a cross-sectional view of the spiral bracket of FIG. 2A taken along the line 2D-2D of FIG. 2B.

Referring now to FIGS. 2C and 2D, the cover plate 126 is a sheet formed of a second spiral pattern 203 following the same varying curvature or path 220 that is illustrated in FIG. 2B. The second spiral pattern 203 has a pattern width 224 that is greater than the first pattern width 222 of the back plate 125. The second spiral pattern 203 has a cover width 232 that is greater than the slot width 230 and thus, greater than the thickness of the metal strip 127.

As illustrated in FIG. 2C, the cover plate 126 includes a plurality of spaced apart weld holes 129. During assembly, after the metal strip 127 is bent, aligned with and welded or otherwise secured onto the back plate 125 such that it extends outwardly therefrom, the cover plate 126 is aligned with and placed onto the bent metal strip 127 such that the through weld holes 129 are aligned with the metal strip 127. In order to secure the cover plate 126 to the metal strip 27, weld deposits 231 are filled inside the weld holes 129 receive weld deposits 231 so as to fuse the cover plate 126 to the metal strip 127, as best illustrated in FIG. 2D. Similarly, the opposite end of the metal strip 127 is welded to the back plate 125 with weld deposits 233 at selected locations sufficient to withstand expected side forces that may disengage the metal strip 127 from the back plate 125.

Although the embodiment shown in FIGS. 2A-2D illustrates a respective piece of metal strip 127 fitting within the respective slots 210 and 212, in other examples the metal strip 127 may be a single continuous piece, for example, bent at two perpendicular angles to form the terminal end 133 near the center of the spiral to fit into both of the slots 210 and 212. In other embodiments, the metal strip 127 may include multiple pieces to be assembled together (e.g., by welding) to fit in each of the two slots 210 and 212. When multiple pieces of metal strips are used to form the metal strip 127, additional weld points may be provided to join the multiple pieces.

Furthermore, in some embodiments, the metal strip 127 may be made of a different material than the back plate 125, or the cover plate 126, or both. For example, when increased strength is desired for higher door travel speeds, the metal strip 127 may be thicker than the back plate 125, or the cover plate 126, or both. On the other hand, when cost and weight reduction is prioritized, the metal strip 127 may be thinner than the back plate 125, or the cover plate 126, or both.

Figure 3:
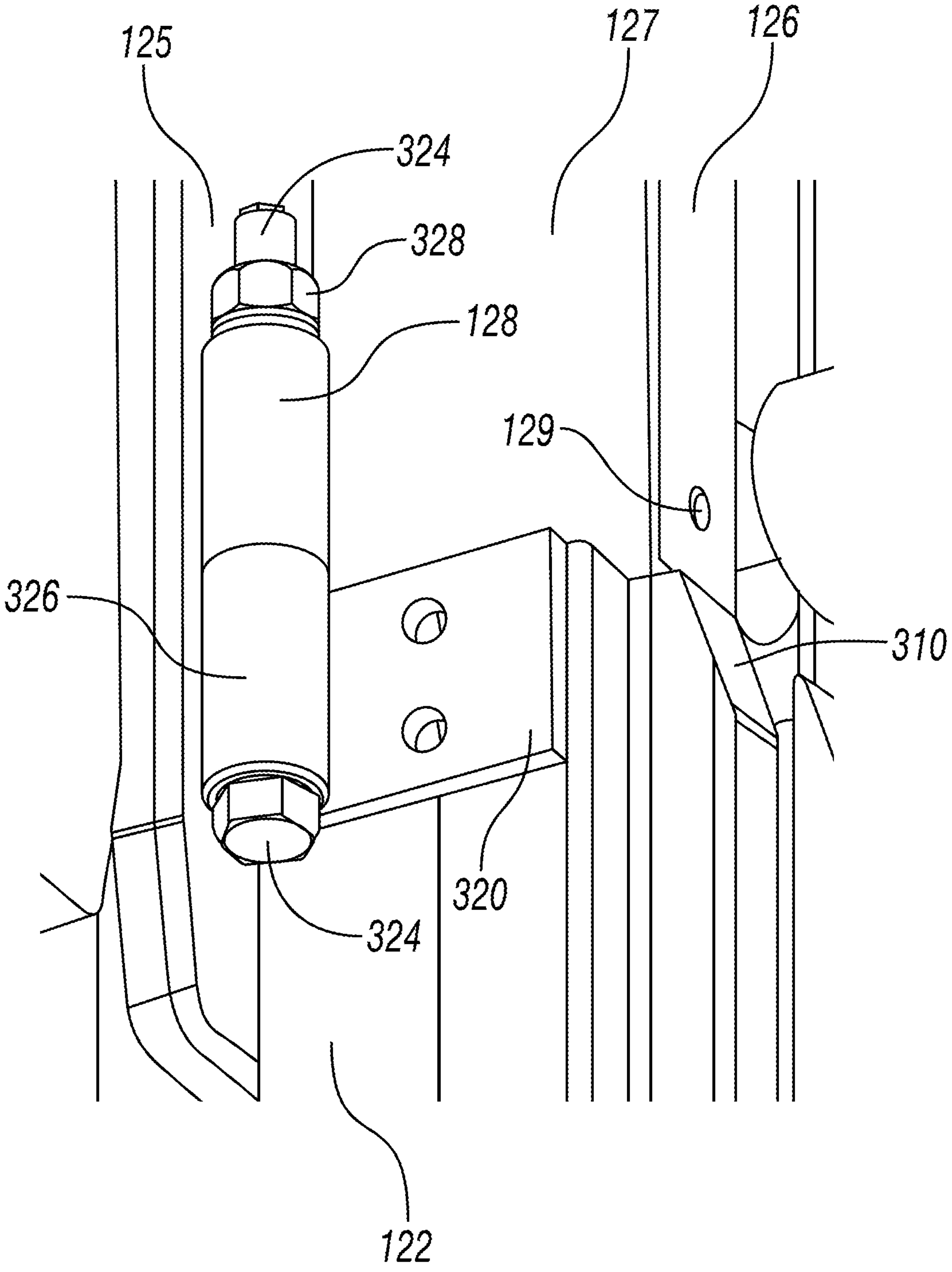
FIG. 3 is a perspective view of an alignment mechanism of the spiral bracket illustrated in FIGS. 1-2D.

FIG. 3 is a perspective view of the alignment mechanism 128 of the spiral bracket 120. FIG. 3 shows that the cover plate 126 is aligned with a face of the vertical track 122. In the embodiment illustrated, the vertical track 122 further provides a ramp 310 for the side of the slats 110 to smoothly ride onto the track 122. The vertical track 122 includes an alignment structure 326 corresponding to the alignment structure 128 of the spiral bracket 120.

An alignment pin may pass through both the structures 326 and 128 when the vertical track 122 is ideally aligned with the spiral bracket 120. For example, a pin or bolt 324 may pass through the structures 326 and 128 and fastened with a nut 328 for maintaining the alignment. In some embodiments, the alignment structure 326 is affixed onto the vertical track 122 with an attachment piece 320 such that the relative orientation and position between the attachment piece and the vertical track 122 may be adjusted. Once adjusted, the attachment piece 320 may be fastened or welded onto the vertical track 122.

Figure 4:
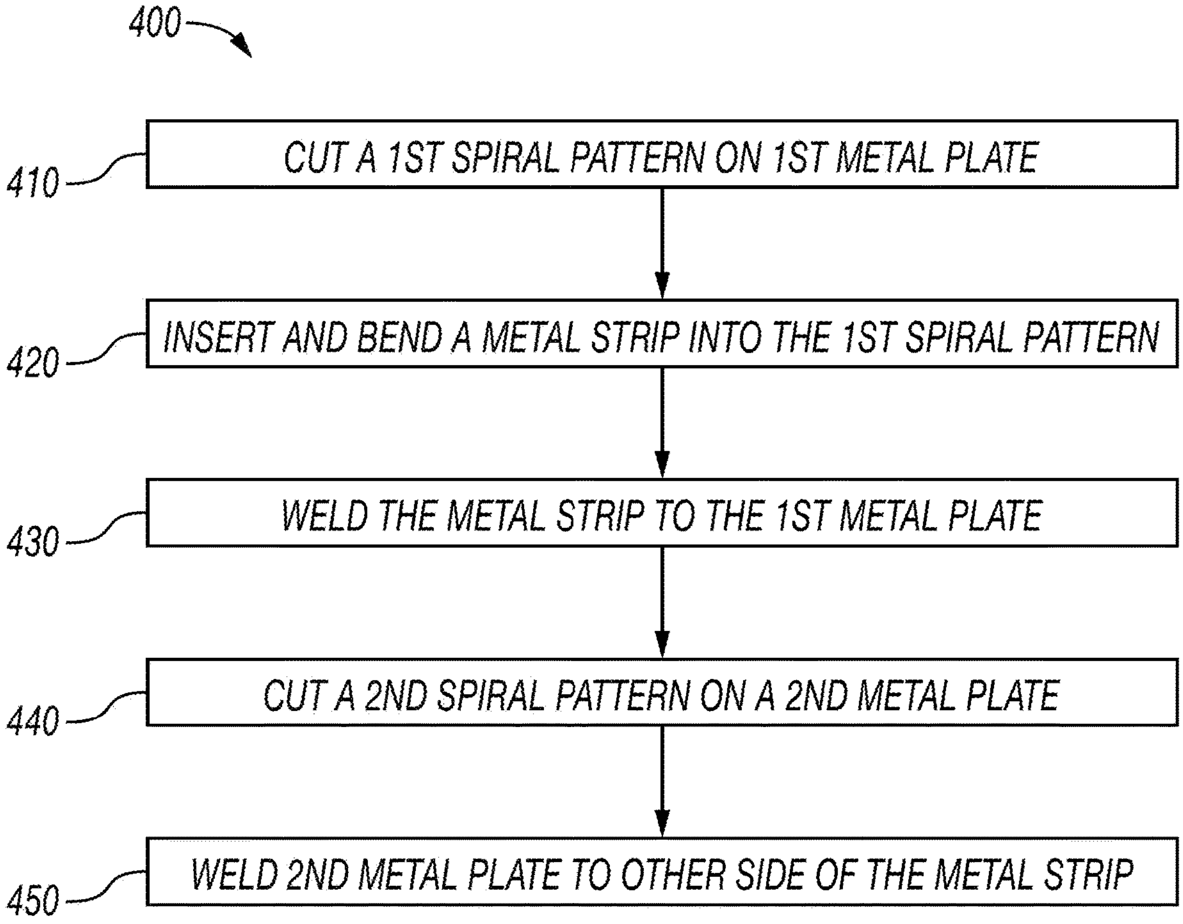
FIG. 4 is a block diagram illustrating a method for manufacturing the spiral bracket illustrated in FIGS. 1-2D.

FIG. 4 is a flow chart 400 of the method for manufacturing the spiral bracket 120 of FIG. 2A. At step 410, a first spiral pattern is formed in a metal plate. The spiral pattern may be created using various machining methods, including laser cutting, milling, stamping, carving, or other similar methods. In some embodiments, the first piece of metal plate is a stainless steel plate of a uniform thickness, such as about 5 mm to 10 mm, or about ⅛" to ½":

The spiral pattern follows a curvature defined by an initial radius and a rate of change. For example, the curvature may start at a point measured at the initial radius from a center at a starting reference angle (taken as zero), and moves according to a function of an increasing angle (measured from the reference angle), the function determines a value for at an instant radius R at the increasing angle and may be expressed as: $R(\alpha)=r+c*(\alpha/2\pi)$, wherein $\alpha\geq 0$ is the increasing angle, r is the initial radius, and c is the rate of change (i.e., how quickly the instant radius increases as the spiral rotates). The curvature parameter may be programmed into the machining device that cuts out the spiral pattern. For example, a laser cutting machine may receive the parameters for the variables rand c and then starts the cutting process.

In some embodiments, the first spiral pattern includes two distinct slots, each of which is formed along the curvature and maintains an equal spacing distance. The distance between the two slots form a first pattern width of the first spiral pattern. The two slots include an inner slot that is closer to the center than the curvature and an outer slot that is further from the center than the curvature, and each of the inner and outer slots follows the curvature such that any line perpendicular to the curvature at any point on the curvature would also be perpendicular to the inner and outer slot. In some other embodiments, the two distinct slots may be joined at one end such that there is one continuous slot. In other embodiments, the first spiral pattern may include more than two distinct slots, such as multiple slots following the first spiral pattern suitable for subsequent assembly.

At block 420, a metal strip is bent to correspond in shape to and be inserted into the first spiral pattern, for example, into the inner and outer slots. In some embodiments, the metal strip has the same uniform thickness as the first metal plate. In other embodiments, the metal strip may have a different thickness depending on the required strength. The thickness of the metal strip may be about equal to or slightly less than the width of the inner and outer slots in the first metal plate such that the metal strip can be fully inserted into the slots. In this way, one side of the metal strip is aligned with a back face of the first metal plate (e.g., as illustrated in FIG. 2D).

In other embodiments, the metal strip may be partially inserted into the inner and outer slots. Yet in other embodiments, the metal strip need not be inserted into the inner and outer slots and a welding process deposits weld materials through the inner and outer slots to unify the bent metal strip to the first metal plate. Other methods of assembly may be used so as to make the metal strip conform to the first spiral pattern such that it serves as a track for a roller to pass within along the curvature, such as by use of a spacer, fastener, or the like.

At block 430, after the metal strip is inserted into the slots of the first metal plate, the metal strip is then welded thereon. In some embodiments, the welding process includes continuously filling the seam between the metal strip and the first metal plate. In some other embodiments, the welding process includes depositing weld materials at spaced apart locations on the seam between the metal strip and the first metal plate. In other embodiments, the welding process includes a combination of providing a continuous fusing and spot welding at selected locations. The expected loading condition related to the operation speed of the roll-up door provides major guidance to the type of weld material, where the weld needs be applied, and the amount of energy input for fusing the metal strip to the first metal plate. For example, the higher the strength requirement, the more welding materials and more energy input may be applied to unify the metal strip to the back plate.

At block 440, a second metal plate is cut into a second spiral pattern. The second spiral pattern follows the same curvature of the first spiral pattern. The second spiral pattern has a second pattern width that is greater than the first pattern width. The second spiral pattern may further include cover width that is greater than the slot width and thus the thickness of the metal strip. The second metal plate is then positioned onto the bent metal strip such that the second spiral pattern aligns with the first spiral pattern of the first metal plate. In some embodiments, a number of through holes are added to the second spiral pattern for subsequent welding processes.

At block 450, the second metal plate is welded onto the metal strip at the side opposing the one that is inserted in to the first metal plate. In some embodiments, the second metal plate includes a number of through holes tracing the location of the inner and outer slots of the first spiral pattern and thus the inserted metal strips. Weld deposits are filled in the through holes and fuse the metal strip and the second metal plate together. In some embodiments, the through holes may be slots. In some other embodiments, the density of the through holes (i.e., number of holes per unit length) may depend on the strength requirement for the assembly. For example, the first and the second metal plates confine side movements of the roll-up door. The weld applied needs to be sufficient to withstand loads associated with the side movements.

The method for making the spiral bracket as illustrated in the flow chart 400 has several advantages. First, all three pieces, including the first metal plate, the metal strip, and the second metal plate, may be made of a same stock metal plate. Second, all three pieces may be cut from the same stock metal plate using an efficient method, such as laser cutting or milling. Third, the accurate cutting will enable efficient assembly because the first metal plate ensures the metal strip to be properly bent and aligned with the second metal plate. Finally, the method is scalable to any sizes with variables such as initial spiral diameter, the rate of change, the sizes of the slats, and the thickness of the metal plates (i.e., associated with the slot width) programmable to the cutting process.

For example, a user may provide a set of the parameters to produce spiral brackets for roll-up doors according to their sizes and operation speeds. A cutting machine can then automatically produce the first metal plate, the metal strip, and the second metal plate for assembly. In some embodiments, the cutting may be performed manually or automatically by a computer numerically controlled device. In some other embodiments, the assembly and welding may be performed manually or automatically by a set of robotic arms. Other variations are possible.

Figure 5A:
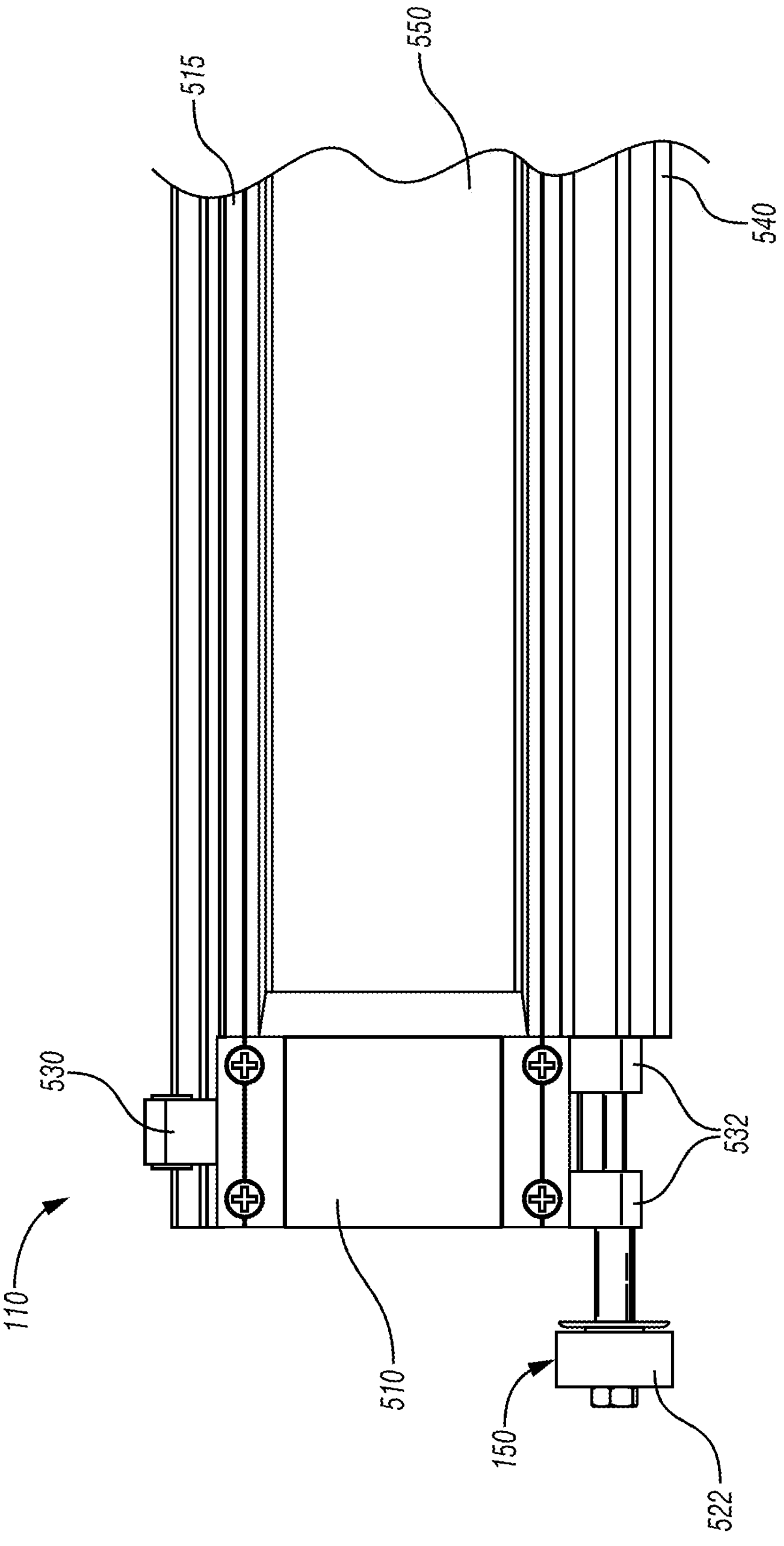
FIG. 5A is a rear view of a portion of a slat of the high-speed roll-up door of FIG. 1.
Figure 5B:
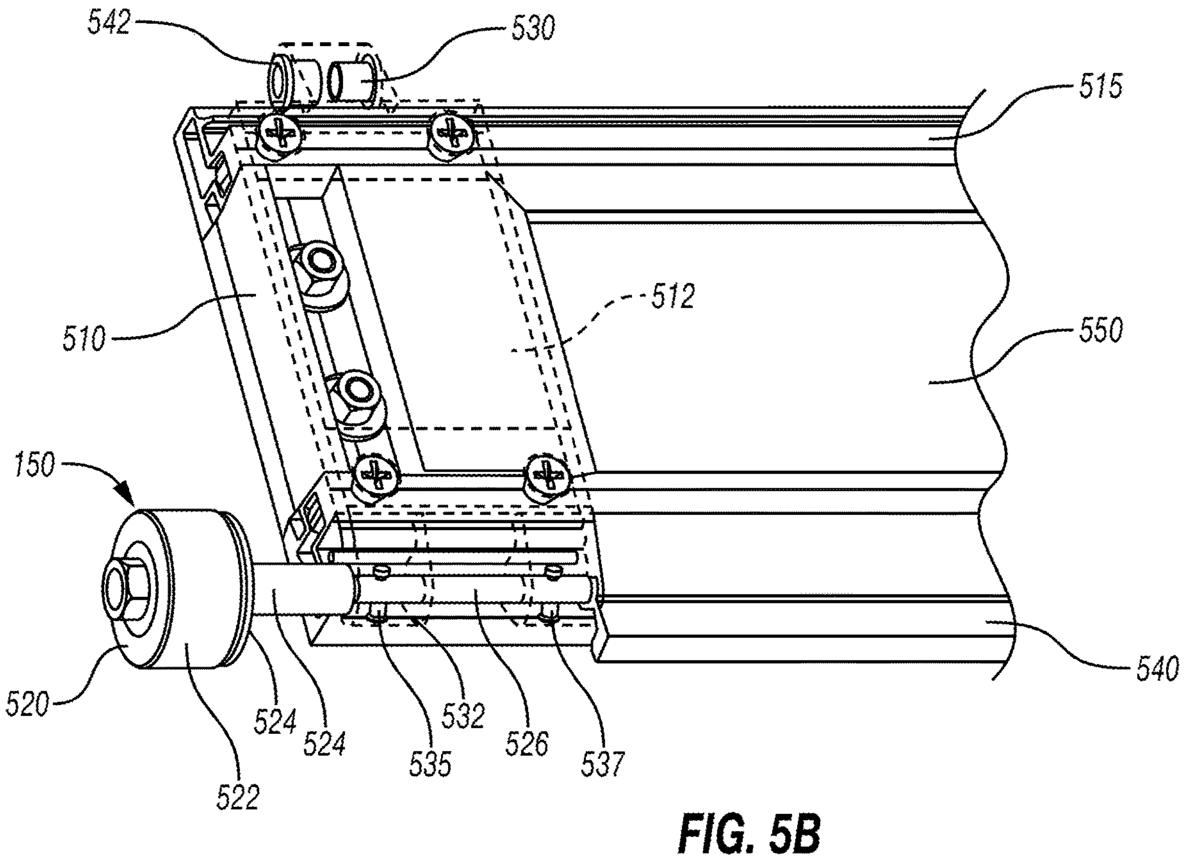
FIG. 5B is a perspective view of the slat illustrated in FIG. 5A.

Turning now to FIGS. 5A and 5B, FIG. 5A is a rear elevational view and FIG. 5B a perspective view of a slat 110 of the high-speed roll-up door assembly 100. In FIG. 5A, the slat 110 includes a frame 515 assembled with an end cover plate 510. The end cover plate 510 secures a rubber seal 540 and a cover 550 to the frame 515. In some embodiments, the cover 550 may be a transparent window. The slat 110 further includes a first upper hinge 530 and a second lower hinge 532. The hinges 530 and 532 are formed by both the frame 515 (e.g., forming the bottom half) and the end cover plate 510 (e.g., forming the upper half). The first hinge 530 has a profile that is rotatably mate-able with the profile of the second hinge 532. For example, another piece of slat 110 may have a mate-able hinge for engaging the first hinge 530 or the second hinge 532. The hinges may be assembled with a roller 150 whose shaft inserts through the hinges. Details of the roller 150 are shown in FIG. 5B.

The roller 150 includes a wheel 522 supported by a bearing 520, a sleeve 524, and a shaft 526. The bearing 520 enables the wheel 522 to rotate smoothly around the shaft 526. The wheel 522 is formed of an elastic material, such as urethane, to absorb noise during high speed movement of the plurality of the slats 110. In other embodiments, the wheel 522 may be made of neoprene for its low noise characteristics. In other embodiments, the wheel 522 may be made of nylon, rubber, or other materials for hardness, wearability, and noise considerations. The wheel 522 travels in, and is guided by, the vertical track 122 and the spiral bracket 120 as the door 113 travels between the open and closed positions.

In the embodiment illustrated in FIG. 5B, the sleeve 524 serves as a spacer member and overlays and otherwise protects the shaft 526. Fasteners 535 and 537 affix the shaft 526 to the hinges 532. For example, the shaft 526 includes two threaded holes for receiving the fasteners 535 and 537. In some embodiments, the fastener 535 may not be included and the shaft is secured by the fastener 537. This configuration can facilitate a design change to strengthen the roller "shaft". The shaft now maintains the large 3/8" diameter into the first hinge flange (where the fastener 535 is currently shown) and steps down to 5/16" at the end of this flange. Accordingly, the shaft 526 has one threaded hole to receive the fastener 537 without additional fasteners.

In some embodiments, the shaft 526 may include a key or a like alignment structure such that when the shaft 526 is inserted into the hinge 532, the threaded holes are aligned with corresponding holes in the hinge 532 for the fastener 537 to pass through. The shaft 526 of the roller 150 is inserted into the slat 110 in a longitudinal direction (i.e., along the axis of the hinges 532). The fastener 537 move in and out of slat 110 in a transverse direction that is perpendicular to the longitudinal direction. When the slat 110 travels to the spiral bracket 120, the fastener 537 may be exposed as the slats 110 form an angle in order to conform to the curvature of the spiral pattern. For example, the fastener 537 are oriented in a manner that they are not exposed when the roll-up door 100 is in the closed position but are exposed and accessible by tools when the roll-up door 100 is in the open position.

In some embodiments, the cover 550 may include a thick end portion 512 at each end. For example, the cover 550 may primarily be made of a light and transparent material, such as a piece of molded acrylic or polycarbonate plastic sheet. The thick end portion 512 may be sandwiched by or inserted in between the cover 515 and the end cover plate 510. In some embodiments, the thick end portion 512 is made of the same material as the cover 550. In some other embodiments, the thick end portion 512 is produced together as the cover 550, such as in a same work piece.

Figure 6:
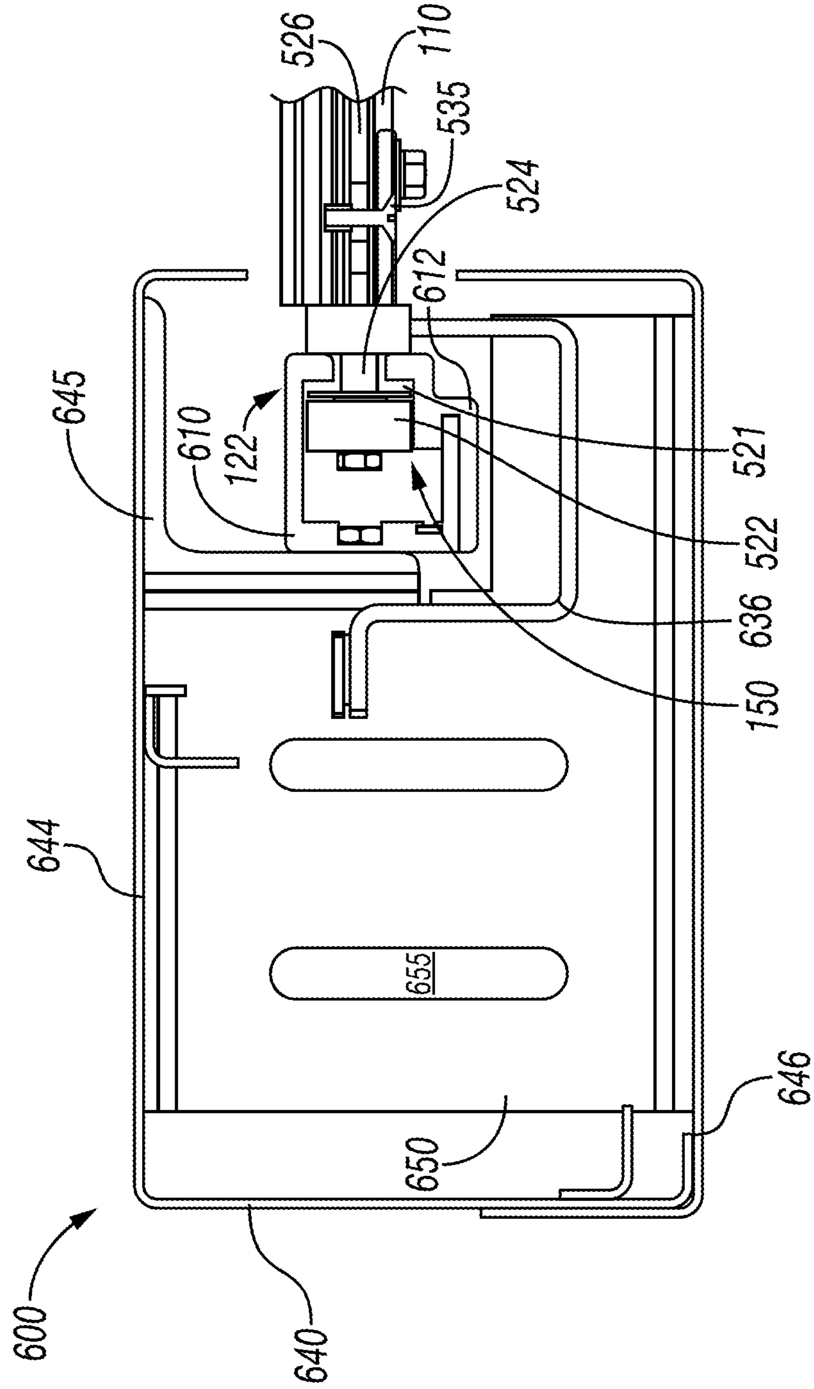
FIG. 6 is a section view of a side column of the high-speed roll-up door of FIG. 1 taken along the line 6-6.
Figure 7:
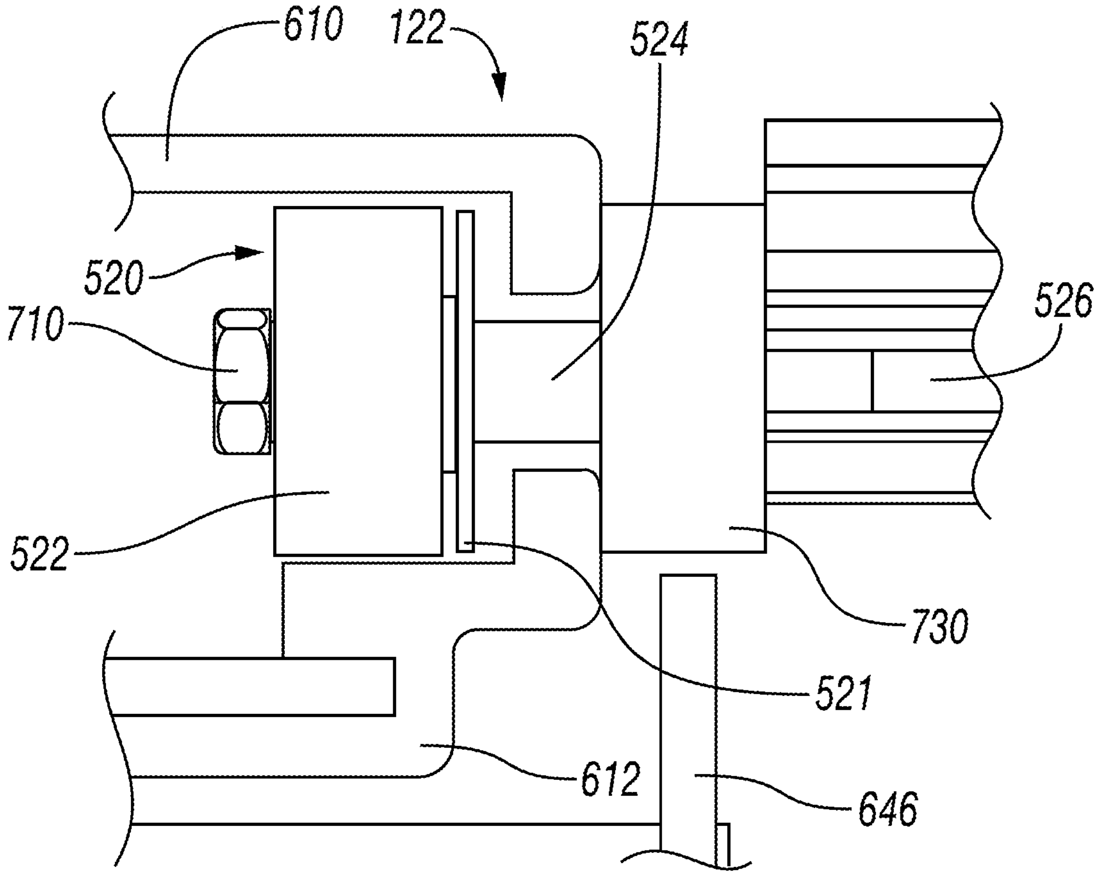
FIG. 7 is a detail view of the side column of FIG. 6.

Turning now to FIGS. 6 and 7, a side column 600 of the high-speed roll-up door assembly 100 is illustrated. The side column 600 houses the vertical track 122 and provides overall structural support for the roll-up door 100. In particular, the side column 600 includes a vertical frame 640 and a bottom member 650. According to some embodiments, the vertical frame 640 is be formed by two bent metal plates 644 and 646. The bent metal plate 646 may be removably attached to the bent metal plate 644. The bottom member 650 may include fixture holes 655 for fastening the side column 600 to the ground. The frame 640 and the bottom 650 may be welded together or be separately attachable.

In the embodiment illustrated in FIG. 6, the vertical track 122 may be formed by two bent metal plates 610 and 612 affixed together by removable fasteners. The metal plate 610 is fastened onto the side column 600 while the cover metal plate 612 may be removably attached to the metal plate 610. In some embodiments, the metal plate 610 is fastened onto the side column 600 via an "L" shaped reinforcing structure 645. The reinforcing structure 645 may be further connected with an internal column 636 surrounding the metal plate 612.

In some embodiments, the cover metal plate 612 may be removed without disturbing other parts of the side column 600. As such, the roller 150 may be accessible for removal from the slat 110 by just removing the fasteners 535 and 537. In some embodiments, only the fastener 537 is used to hold the roller 150 in place. For example, the slats 110 are first moved to a position exposing the fastener 537 near the spiral brackets 120. The cover metal plate 612 is then removed exposing the specific roller 150 to facilitate removal of the fastener 537. The roller 150 is then translated toward the metal plate 610 and removed from the vertical track 122. This configuration thus enables replacement of individual roller 150 without the necessity to disassemble the slats 110 from the side column 600.

As shown in the example of FIG. 7, in some embodiments, the roller 150 may further include a fastener 710 for attaching the wheel 522 to the roller shaft 526. A spacer 730 may be added on top of the sleeve 524 for closing the gap between the sleeve 524 and the surrounding structures. In some embodiments, the roller 150 further includes a slider washer 521 for preventing the wheel 522 from sliding onto the vertical track 122 or the spiral bracket 120 when the door 100 experiences high side-way loads. Thus, the slide washer 521 performs as a stopper for preventing excessive side movement of the slats 110 without incurring excessive friction. For example, the slide washer 521 is made of a material of low friction coefficient and high wearability such that when the wheel 522 is pulled toward the vertical track 122, the roller 150 can travel along the vertical track 122 without substantial resistance. In some embodiments, the slider washer 521 is not included in the roller 150 because the roll-up door 100 is prevented from moving in the side direction using other methods.

Although FIGS. 6 and 7 show relative positions of each component, the actual dimension and scale of each component may differ from the illustration and depend on different production specifications. For example, the bent metal plates 644, 646, 610 and 612 may have different thickness, proportions, or sizes than what is illustrated in FIGS. 6 and 7. Other structures according to the disclosure of FIGS. 6 and 7 may vary for providing the specified geometrical relationship and assembly requirement.

Figures 8A, 8B, 8C:
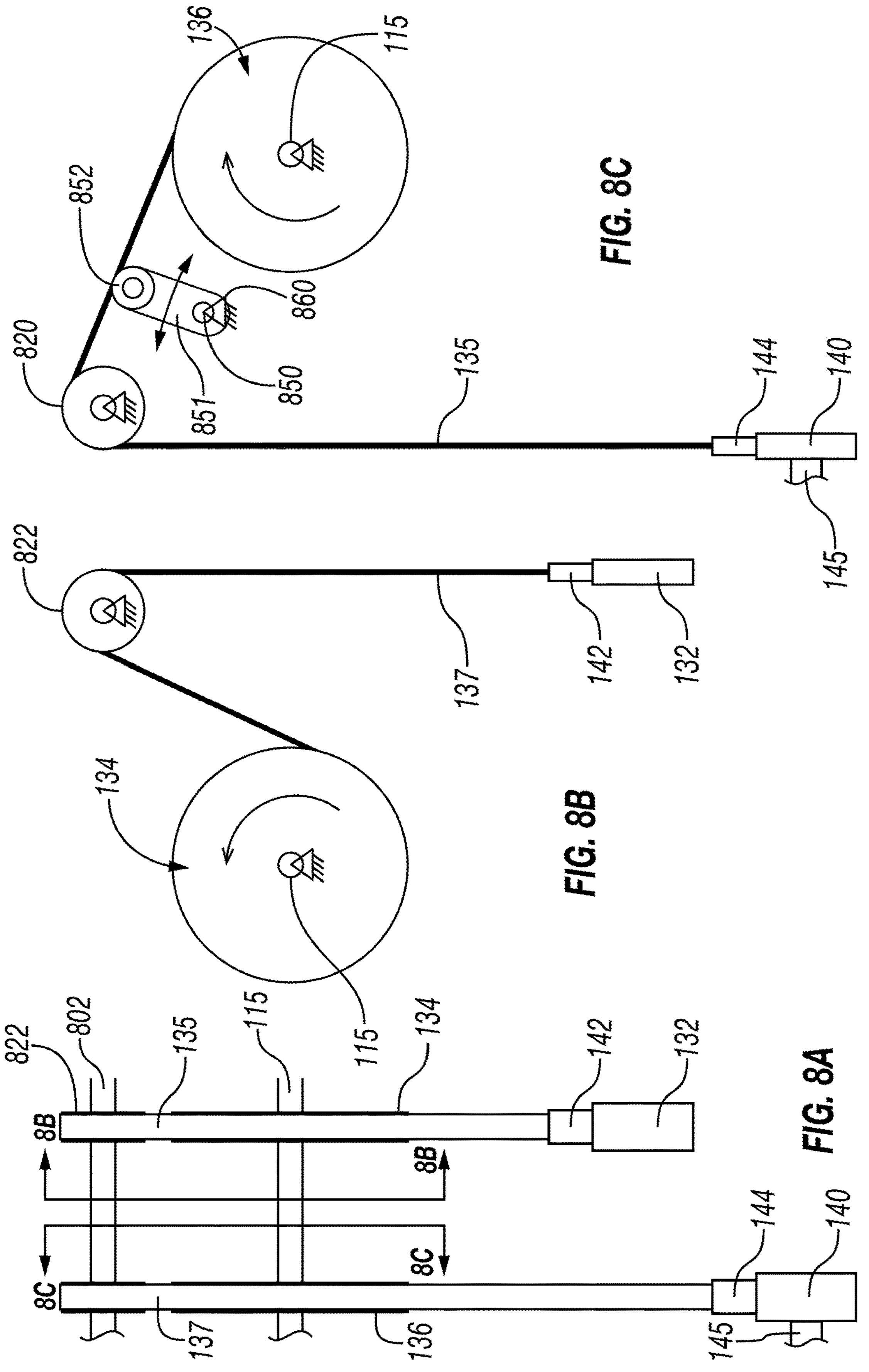
FIG. 8A is a front view of a double-belt counterweight mechanism of the high-speed roll-up door of FIG. 1.
FIGS. 8B and 8C are left and right side views of the double-belt counterweight mechanism of the high-speed roll-up door of FIG. 1.

Referring now to FIGS. 8A, 8B, and 8C, the double-belt counterbalancing and drive system is illustrated. The double-belt counterbalancing mechanism and drive system 130 includes the common shaft 115 rotatably connecting the first power reel 134 and the second power reel 136. The first power reel 134 holds the first belt 135 and the second power reel 136 holds the second belt 137. A support shaft 802 provides an axis of rotation for a first guide reel 820 and a second guide reel 822. The first guide reel 820 is tangentially aligned with a bottom end 145 of the slats 110 of the high-speed roll-up door 100. The second guide reel 822 is tangentially aligned with a track through which the counterbalancing weight 132 travels.

In some embodiments, there is a first ratchet mechanism 142 connecting the belt 135 to the bottom end 140 of the high-speed roll-up door 100. A second ratchet mechanism 144 connects the belt 137 to the counterbalancing weight 132. The first ratchet mechanism 142 is operable to adjust the length of the belt 137 for adjusting the position of the counterbalancing weight 132 such that it hangs above the ground when the high-speed roll-up door 100 is at a fully open position. In this manner the counterbalancing weight 132 always pulls the belt 137 and applies a counterbalancing torque to the first power reel 134.

Figure 9:
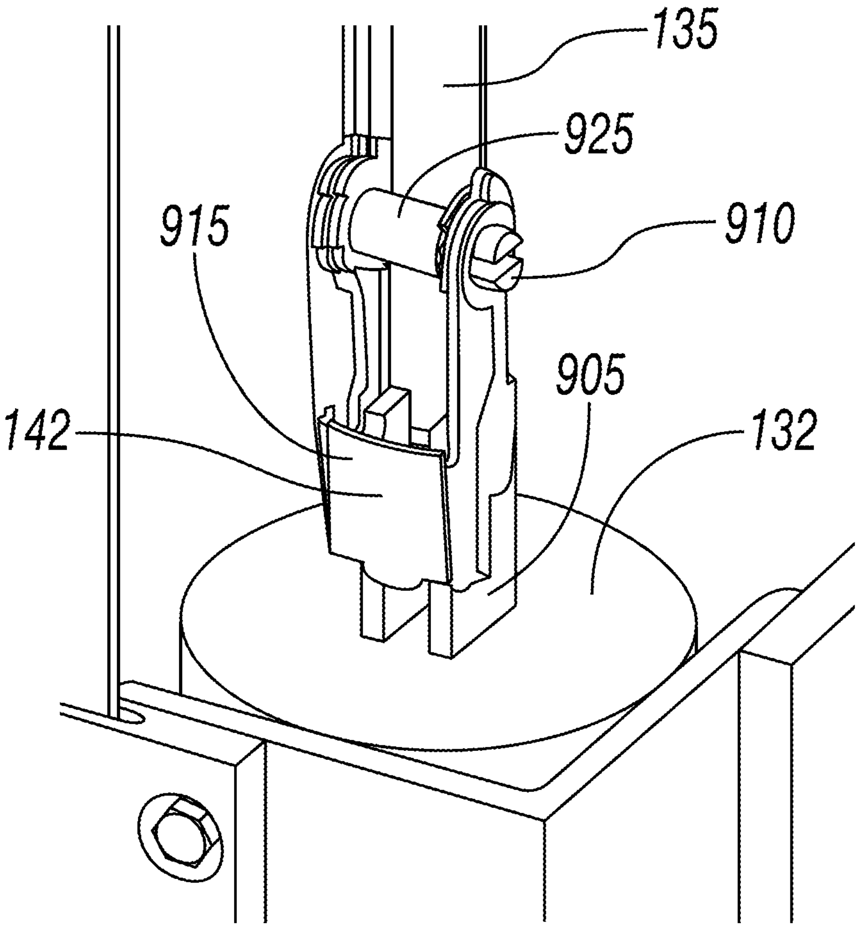
FIG. 9 is a perspective view of a ratchet mechanism for the high-speed roll-up door of FIG. 1.

Similarly, the second ratchet mechanism 144 adjusts the length of the belt 135 for adjusting the position (i.e., the elevation) of the bottom ends 140 of the high-speed roll-up door 100 for horizontal alignment. For example, when both sides' vertical tracks 122 are installed to be perpendicular to a flat ground surface, the slats 110 of the roll-up door 100 are configured to be parallel to the flat ground surface such that each slat 110 travels in an orientation perpendicular to the vertical tracks for the rollers 520 to smoothly rotate in the vertical tracks 122 and the spiral brackets 122. Thus, in order to avoid additional friction when the roll-up door 100 is skewed (i.e., not parallel to) with respect to the flat ground surface, the length of the belt 135 may be adjusted using the ratchet mechanisms 144 on either side, or both, to the designed configuration. Details of the ratchet mechanism 142 and 144 are shown in FIG. 9 and discussed below.

Turning now to FIG. 8C, the double-belt counterbalancing and drive system 130 further includes a tensioner 851 positioned between the guide reel 820 and the power reel 136 for determining the tension level of the belt 135 and, if tension is lost, stopping movement of the motor. The tensioner includes a pulley/wheel 852 for contacting and rotating in response to movement of the belt 135. In the embodiment illustrated in FIG. 8C, the tensioner 851 adjusts its position by pivoting around an axis 850 provided by base 860. For example, the angle 853 of the tensioner 851 may be adjusted to calibrate to an initial tension of the belt 135 under normal operation. In operation, the tensioner 851 is operable to detect changes of the tension of the belt 135. For example, as the tension decreases in the portion of the belt 135 between the support reel 820 and the power reel 136, the tensioner 851 moves in response to that decrease. In some embodiments, the tensioner 851 is spring loaded in its rotational direction such that the rotational spring loads it receives at the pivot 860 balances the moment resulting from the tension applied by the belt 135. In other embodiments, the tensioner 851 may be linearly spring loaded to extend or retract according to the tension in the belt 135.

In some embodiments, the tensioner 851 includes a sensor that monitors the tension in the belt 135 in response to the movement of tensioner 851. For example, the sensor may be a strain gauge, a piezoelectric component, an electromagnetic sensor (e.g., a Hall sensor), a light sensor (e.g., an infrared, or laser, emitter and detector) or the like. In different embodiments, the sensor may be installed inside the tensioner 851, such as mounted onto the structure or movable parts. In other embodiments, the sensor may be installed external to the tensioner 851.

When the tensioner 851 determines that the tension in the belt 135 is under a threshold value, the tensioner 851 sends a signal to the drive system 102 to stop the drive system 102 from further releasing the belt 135 from the spool 136. For example, when the roll-up door 100 is inadvertently jammed, the rotation of the shaft 115 would lift up the counterbalance weight 132 but would not lower the slats 110. Thus, the tension in the belt 135 decreases. Without the tensioner 851 monitoring the tension in the belt 135, the belt 135 will be released from the power reel 136 and no longer be holding the jammed slats 110. This could potentially cause a sudden drop or fall of the jammed slats 110 if the slats were to become free. Thus, the tensioner 851 detecting the decrease in tension in the belt 135 and stopping the motor operation can prevent such occurrences and enable the counterweight to remain engaged to counterbalance the weight of the slats 110.

FIG. 9 is a detail view of the ratchet mechanism 142. The ratchet mechanism 144 is structurally similar to the ratchet mechanism 142. The ratchet mechanism 142 includes a body 905, a shaft 910, a handle 915, a gear 925 and a pawl (not shown in this view). The body 905 is affixed to the counterbalance weight 132. In the case for the ratchet mechanism 144, a respective body would be affixed onto the bottom end 140 of the roll-up door 100. The shaft 910 rotates relative to the body 905 and is rotatably affixed to the gear 925. The shaft 910 is coupled with an end of the belt 135 such that the rotation of the shaft tightens or loosens the belt 135. The gear 925 rotates freely in one direction and is prevented to rotate in the opposite direction by the pawl.

The handle 915 rotates the shaft 910 and the gear 925, often in one direction. For example, a user may use the handle 915 to tighten the belt 135. In some embodiments, the handle 915 may also be used to release the gear 925, for example, but lifting the handle 915 to a certain position relative to the gear 915 to disengage the pawl. In some other embodiments, a separate release handle may be used to disengage the pawl from the gear 915 for loosening the belt 135. Other variations of the shape, relative size, and configuration of the ratcheting mechanism 142 are possible. For example, in some embodiments, the handle 915 may be of a different length, shape, or coated with a layer of rubber for ease of handling.

Figure 10:
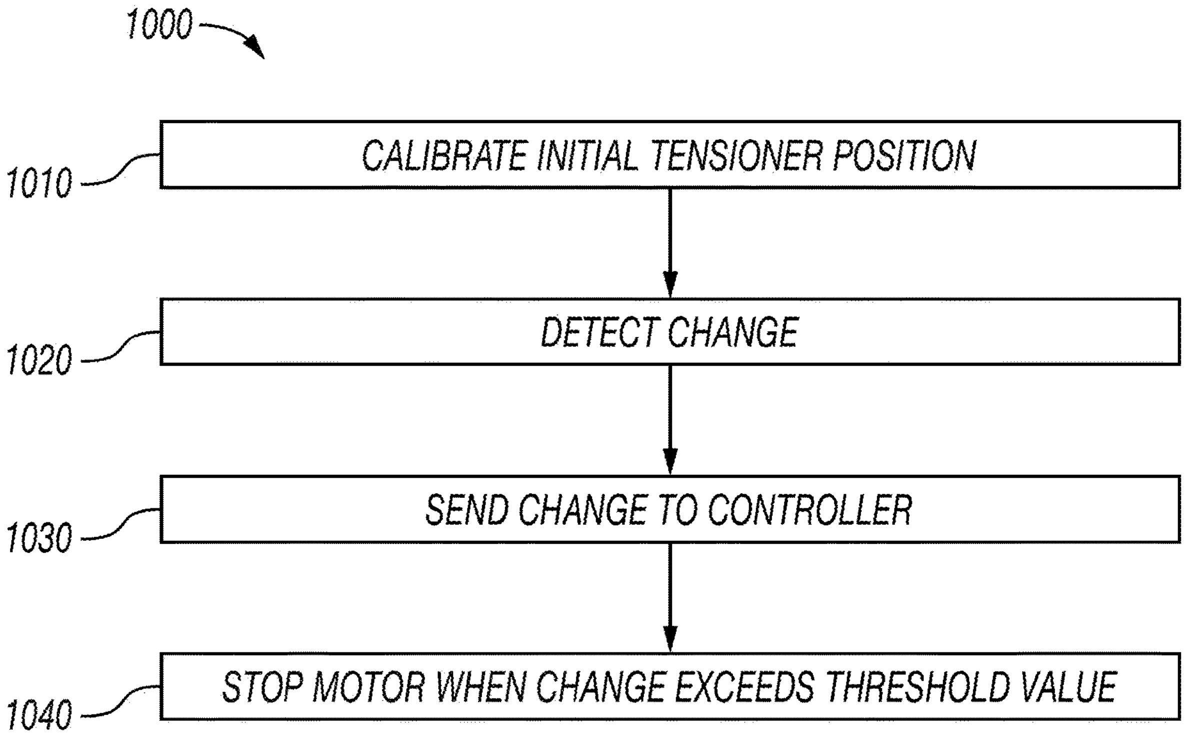
FIG. 10 is a block diagram illustrating a method of operating the high- speed roll-up door of FIG. 1.

FIG. 10 is a flow chart 1000 of the method of operation of the high-speed roll-up door 100 of FIG. 1. At step 1010, an initial tensioner position is calibrated when the belt engaged by the tensioner is properly loaded. For example, the value of tension may change corresponding to the position of the roll-up door 100 as part of the slats 110 are rolled into the spiral brackets 120 while the loading from the counterbalancing weight 132 remains constant. Thus, the calibration may require a certain door position or the value of tension takes into account for different positions.

At step 1020, the tensioner monitors and detects changes of tension of the belt lifting the roll-up door. For example, the tensioner may include onboard sensors and controllers that monitors the current tension value and compare such with a reference tension profile with respect to the door position. A difference between the present tension value and the tension profile may be ascertained. If the difference exceeds certain threshold value, the tensioner may determine there is a substantial change of the tension that may indicate a malfunction of the roll-up door, for example, when the door is accidentally jammed.

At step 1030, the tensioner sends the detected change to the controller of the roll-up door, such as a controller in the control terminal 101 or a motor controller in the driving system 102. The controller may further process the detected change to determine the cause for such change. At step 1040, based on the determination, such as when the change exceeds a predetermined threshold value, the controller stops the driving motor to prevent further operation of the roll-up door.

For example, when the tension drops in the belt holding the bottom end 140 of the roll-up door 100, it is likely that one or more slats 110 is accidently jammed in the vertical tracks 122. If the motor continues to run to lift the counterbalance weight 132, the slats 110 may suddenly drop due to external disturbance removing the jam. Thus, stopping the operation of the motor can enable the counterbalance weight 132 to continue to balance the weight of the slats 110 until the issue that decreases the belt tension is identified and resolved.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as “outer” and “inner,” “upper” and “lower,” “first” and “second,” “internal” and “external,” “above” and “below” and the like are used as words of convenience to provide reference points and are not to be construed as limiting terms.

In addition, the foregoing describes only some embodiments of the invention(s), and alterations, modifications, additions and/or changes can be made thereto without departing from the scope and spirit of the disclosed embodiments, the embodiments being illustrative and not restrictive.

Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

Although specific embodiments have been described in detail, those skilled in the art will also recognize that various substitutions and modifications may be made without departing from the scope and spirit of the appended claims.

What is claimed is:

1. A high-speed roll-up door assembly comprising:

a plurality of sectional panels slidingly moveable between an open position and a closed position, each of the plurality of sectional panels having a roller at each end;

a track enclosing the roller, the track having a removable cover; and wherein the roller includes a shaft that is secured to a respective sectional panel of the plurality of sectional panels via a fastener such that when the plurality of sectional panels is in the open position the fastener is exposed for removal and when the plurality of sectional panels is in the closed position the fastener is concealed by a portion of a respective adjacent sectional panel such that the fastener is inaccessible.

2. The high-speed roll-up door assembly of claim 1, wherein the track comprises a straight section and a spiral section.

3. The high-speed roll-up door assembly of claim 2, wherein the plurality of sectional panels are retracted in the spiral section in the open position.

4. The high-speed roll-up door assembly of claim 1, wherein the shaft of the roller is inserted into the respective sectional panel in a longitudinal direction and the fastener moves in and out of the respective sectional panel in a traverse direction perpendicular to the longitudinal direction.

5. The high-speed roll-up door assembly of claim 4, wherein the shaft of the roller is secured by two fasteners, including the fastener, holding the shaft to the respective sectional panel.

6. The high-speed roll-up door assembly of claim 1, wherein the roller further comprises a bearing and a tire rotatably coupled to the shaft via the bearing.

7. The high-speed roll-up door assembly of claim 6, wherein the tire of the roller is sufficiently elastic to absorb noise during high speed movement of the plurality of the sectional panels.

8. The high-speed roll-up door assembly of claim 7, wherein the tire of the roller is made of urethane.

9. The high-speed roll-up door assembly of claim 6, wherein the roller further comprises a stopper between the tire and the respective sectional panel such that side movements of the plurality of sectional panels are limited by the stopper that alleviates friction between the bearing and the track.

10. The high-speed roll-up door assembly of claim 7, wherein the tire of the roller comprises neoprene.

11. The high-speed roll-up door assembly of claim 1, wherein the shaft comprises a threaded bore configured to receive corresponding threads of the fastener.

12. The high-speed roll-up door assembly of claim 11, wherein the shaft comprises an alignment structure configured to retain the threaded bore in a fixed orientation relative to the respective sectional panel.

13. The high-speed roll-up door assembly of claim 1, wherein each of the plurality of sectional panels includes a frame and a cover plate removably attachable to the frame with the shaft disposed between the frame and the cover plate.

14. The high-speed roll-up door assembly of claim 13, wherein each of the plurality of sectional panels further includes a cover positioned within the frame, wherein an edge of the cover is secured between the frame and the cover plate.

15. The high-speed roll-up door assembly of claim 13, wherein a hinge is formed between each adjacent pair of sectional panels of the plurality of sectional panels, the hinge being formed by both the cover plate and the frame.

16. The high-speed roll-up door assembly of claim 13, wherein each sectional panel of the plurality of sectional panels further comprises a seal, the seal being secured to the frame by the cover plate.

17. The high-speed roll-up door assembly of claim 13, wherein when the plurality of sectional panels is in the open position the fastener is exposed for removal while the cover plate remains installed on the frame.

18. The high-speed roll-up door assembly of claim 1, wherein when the plurality of sectional panels is in the open position the fastener is exposed for removal from a front side of the door assembly and when the plurality of sectional panels is in the closed position the fastener is concealed on the front side of the door assembly by the portion of the respective adjacent sectional panel such that the fastener is inaccessible from the front side.

19. The high-speed roll-up door assembly of claim 1, wherein transitioning from the fastener being exposed to the fastener being concealed is caused by relative rotation of the respective sectional panel relative to the respective adjacent sectional panel.

20. A method for replacing a roller on a high-speed roll-up door assembly, the method comprising:

sliding a plurality of sectional panels of the door assembly from a closed position to an open position to expose a fastener, wherein each of the plurality of sectional panels has a roller at each end, the roller including a shaft that is secured to a respective sectional panel of the plurality of sectional panels via the fastener such that when the plurality of sectional panels is in the open position the fastener is exposed for removal and when the plurality of sectional panels is in the closed position the fastener is concealed by a portion of a respective adjacent sectional panel such that the fastener is inaccessible;

removing the fastener from the shaft;

removing a removable cover from a track enclosing the roller; and removing the roller from the respective sectional panel by sliding the shaft along a longitudinal axis of the shaft.

* * * * *